United States Patent [19]

Focke et al.

[11] Patent Number: 5,131,804
[45] Date of Patent: Jul. 21, 1992

[54] APPARATUS FOR FORMING GROUPS OF PACKS

[75] Inventors: Heinz Focke, Verden; Uwe Dreyer, Wuppertal, both of Fed. Rep. of Germany

[73] Assignee: Focke & Co., Verden, Fed. Rep. of Germany

[21] Appl. No.: 541,996

[22] Filed: Jun. 22, 1990

[30] Foreign Application Priority Data

Jun. 24, 1989 [DE] Fed. Rep. of Germany ....... 3920711

[51] Int. Cl.⁵ .............................................. B65G 57/30
[52] U.S. Cl. .................................. 414/796; 414/790.3; 414/796.8
[58] Field of Search .............. 414/750, 786, 790.3, 414/795.3, 796, 796.8

[56] References Cited

U.S. PATENT DOCUMENTS

| | | | |
|---|---|---|---|
| 2,752,050 | 6/1956 | Nordquist | 414/790.3 X |
| 2,963,177 | 12/1960 | Shields | 414/790.3 |
| 3,013,369 | 12/1961 | Wilson et al. | |
| 3,834,290 | 9/1974 | Nelson | 414/790.3 X |
| 4,134,502 | 1/1979 | Seragnoli | 414/790.3 |
| 4,720,229 | 1/1988 | Steinhart | 414/790.3 |
| 4,902,184 | 2/1990 | Fritz | 414/790.3 |

FOREIGN PATENT DOCUMENTS

| | | |
|---|---|---|
| 1586258 | 4/1970 | Fed. Rep. of Germany . |
| 1371273 | 10/1974 | United Kingdom . |
| 2017053 | 9/1979 | United Kingdom . |
| 2028285 | 3/1980 | United Kingdom ............ 414/790.3 |

Primary Examiner—David A. Bucci
Assistant Examiner—Janice Krizek
Attorney, Agent, or Firm—Sughrue, Mion, Zinn, Macpeak & Seas

[57] ABSTRACT

A drive for a pusher at the stack of a pack lifter for pushing off several layers of packs, especially paper tissue packs, at a time. A control member (cam shaft 40) adjustable via a handle (hand lever 41) presets the pushing-off movements of the pusher in accordance with the conveying movements of the pack lifter (14), the packs (11) being pushed off the stack (13) in groups consisting of a pre-chosen number of superposed layers in accordance with the setting of the control member.

9 Claims, 6 Drawing Sheets

APPARATUS FOR FORMING GROUPS OF PACKS

BACKGROUND OF THE INVENTION

The invention relates to a process for forming groups of (cuboidal) articles, especially (soft) packs, by pushing said articles off a stack of the articles, by means of a pusher, actuated during fixed cycles, which pushes off articles in the transverse direction, preferably onto a conveyor. The invention furthermore relates to an apparatus for performing this process.

In the packaging technique it is often necessary to produce bundles consisting of several superposed layers of small packs provided with a wrapping. For this purpose, a stack of the packs is formed first by means of a pack lifter, such as the one described in Applicant's German Patent Application P 39 15 600.1 corresponding to U.S. application Ser. No. 07/519,986, now U.S. Pat. No. 5,088,883. The packs are then pushed off this stack in groups of several superposed layers by means of a pusher arranged at the stack. The pack groups having the size of the bundles are then provided with a wrapping in a packing machine.

If bundles of different sizes, consisting of a different number of superimposed layers of small individual packs, such as paper tissue packs, are to be produced, it is necessary to change over the drive of the pusher arranged at the stack of the pack lifter each time.

SUMMARY OF THE INVENTION

The invention is based on the object to propose measures, by means of which stacks of different sizes, i.e. made up of different numbers of articles or packs, can be formed in a simple way without difficult change-over installations.

In order to attain this object it is proposed according to the invention to actuate the pusher in accordance with the number of articles (packs) arranged on top of one another in the region of a collecting plane.

According to the concept of the invention, the packs are continuously or at cyclically delivered from below by a pack lifter so that there is always a stack of several superposed packs, if needed also with several packs lying side-by-side, which are lifted simultaneously in layers. As soon as a preset or desired number of packs lies above a pushing-off plane, the pusher movable in the horizontal plane is actuated and the group of superposed packs (stack) is pushed off in the horizontal direction onto a discharge conveyor.

The height of the stack which is to be pushed off, i.e. the number of packs (e.g. one, two or three packs) lying on top of one another at a pushing-off cycle can be identified in different ways according to the invention and utilized for actuating the pusher. According to a preferred embodiment, the number of superposed packs of the stack is identified by mechanical or electric (electronic), that is to say opto-electronic, scanning means according to which a control signal for the pusher is generated. But it is also possible to determine the number of packs by an adjustable mechanical control member and actuate the pusher accordingly.

The drive for the pusher (pusher drive) runs in synchronization with the drive for the pack lifter. The pushing-off movement for a group of packs is thus in coordination with the working cycle for the delivery of packs to the stack.

Of particular advantage is a pusher drive continuously rotating in synchronization with the pack filter, especially a crank drive, with which the pusher can be coupled temporarily for performing a pushing-off movement. According to a further proposal of the invention, a coupling means is continuously loaded (tension spring) in the direction of the linkage between pusher drive and pusher. A lock for the coupling means is released in accordance with the height of the stack having formed, so that the coupling means can link the pusher to the pusher drive.

Further features of the invention relate to the design of the pusher drive, the coupling means and the lock as well as to the design of a mechanical control means for the pushing-off movements.

Exemplary embodiments of the invention will be described in more detail below with reference to the drawings which show:

DETAILED DESCRIPTION OF THE DRAWINGS

Figure 1:
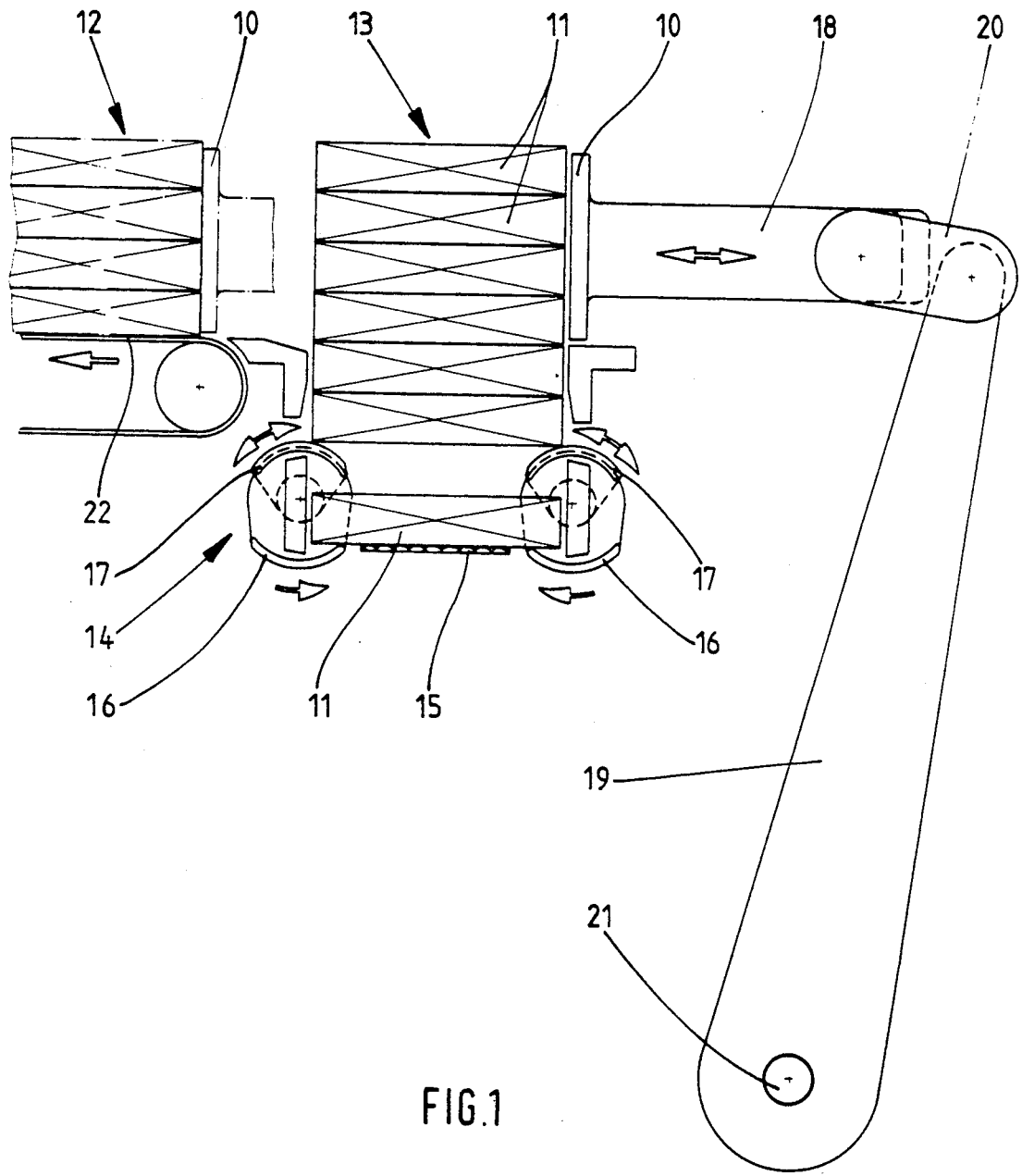
Figure 2:
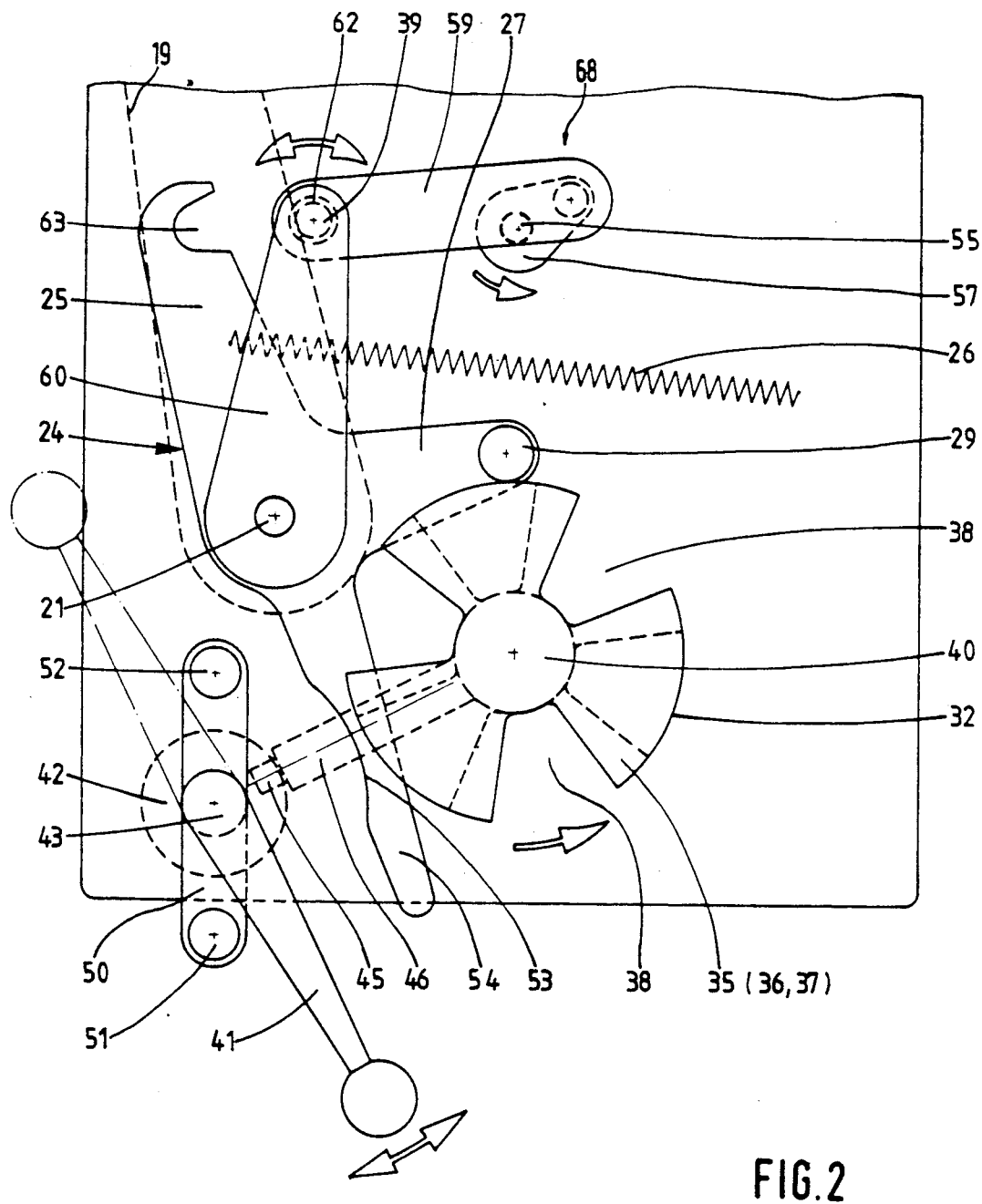
Figure 3:
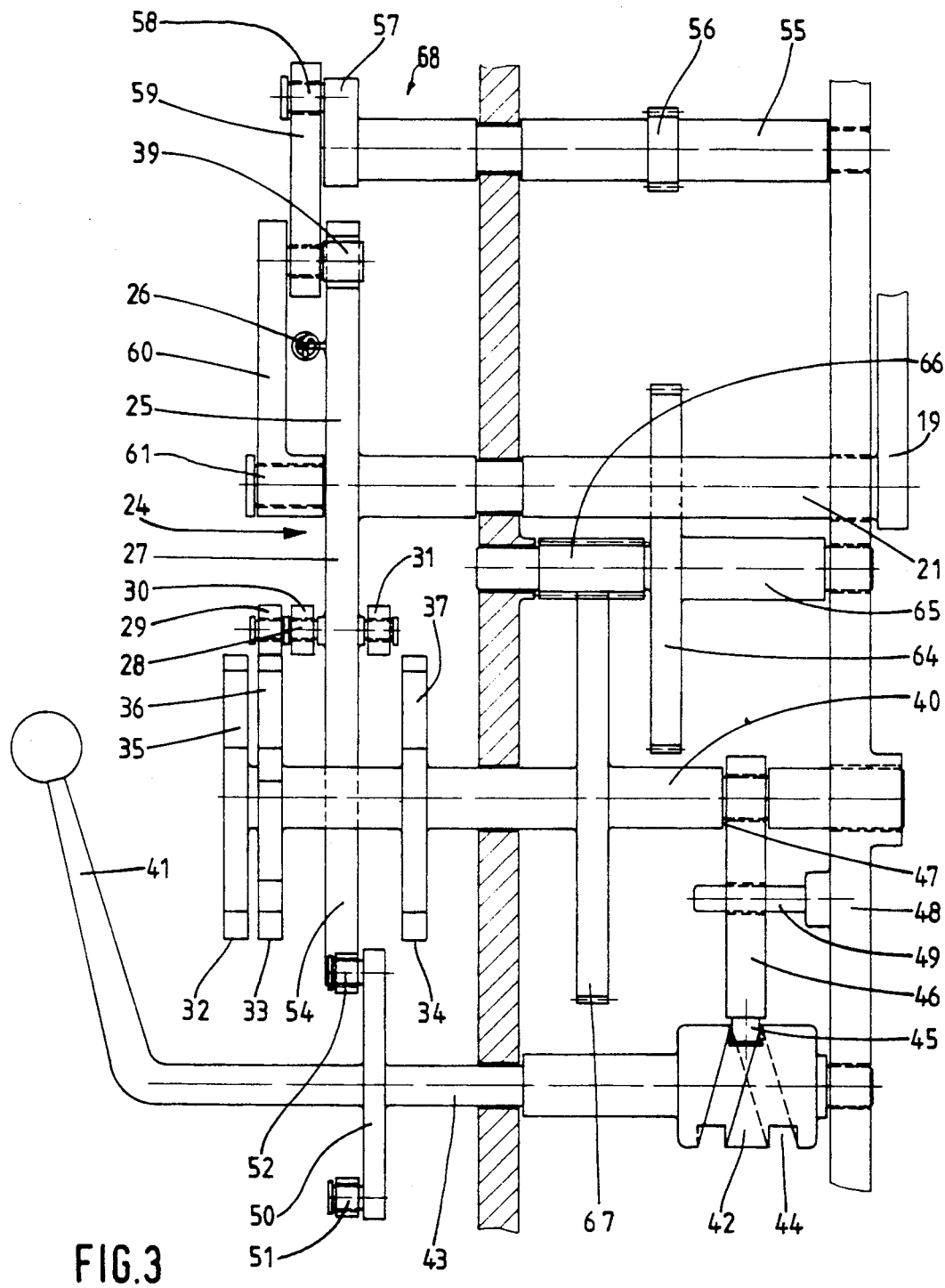

FIG. 1 a diagrammatic representation of a side view of a pack lifter with a pusher arranged at the stack, FIG. 2 a side view of the drive of a pusher as shown in FIG. 1, FIG. 3 a cross-section of the drive of the pusher as shown in FIG. 2.

Figure 4:
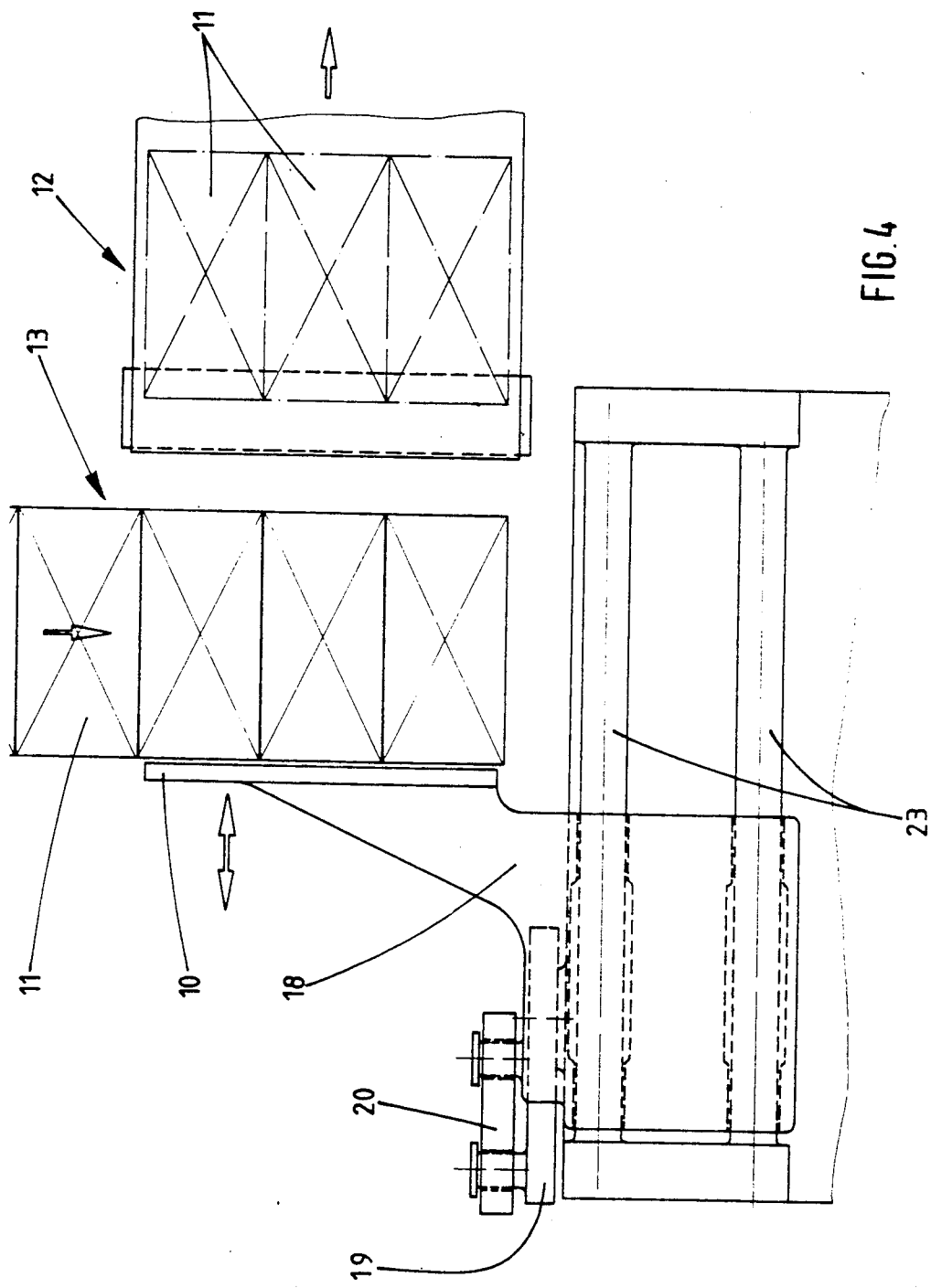

FIG. 4 a top plan view of the pusher as shown in FIG. 1.

Figure 5:
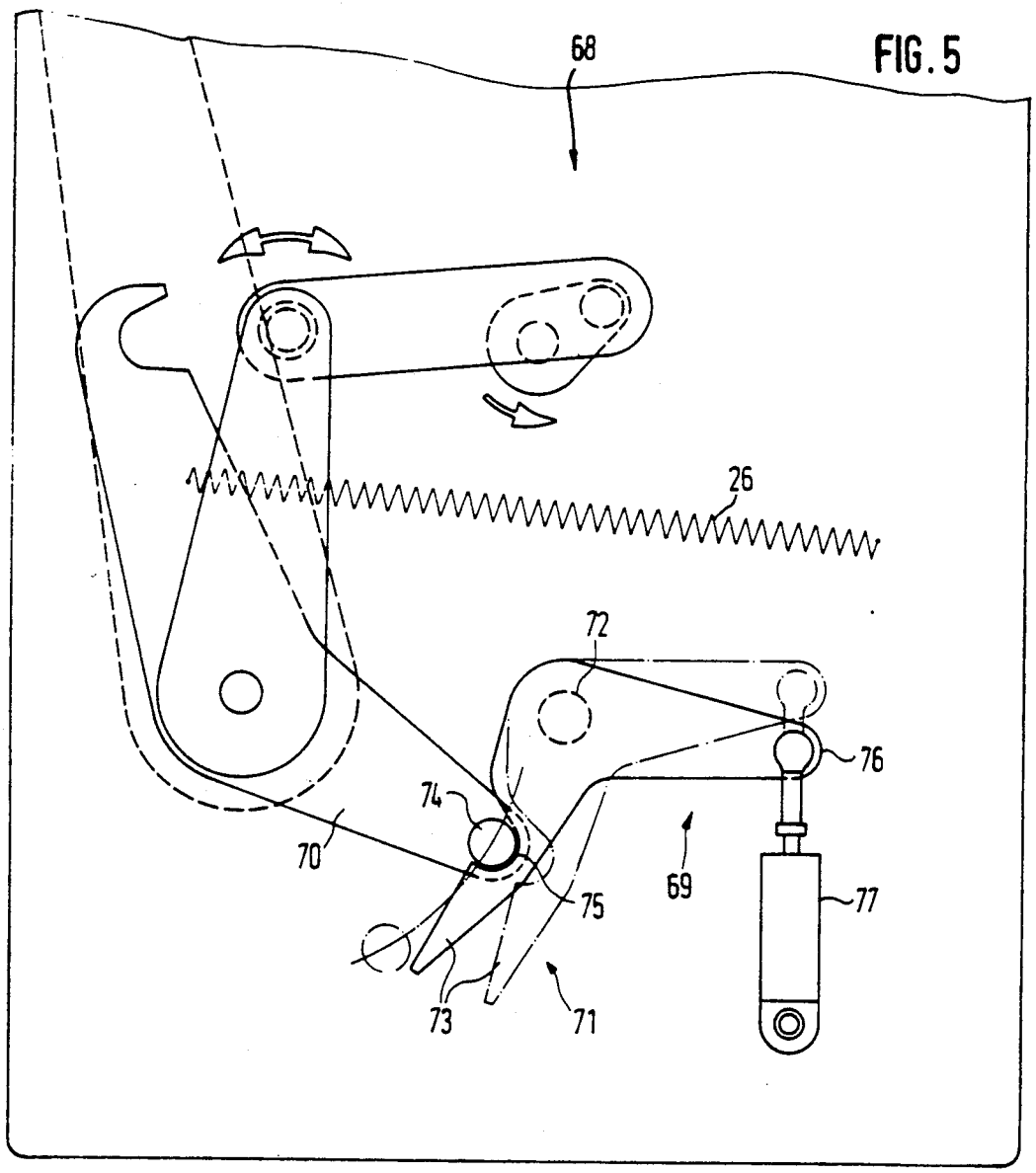
Figure 6:
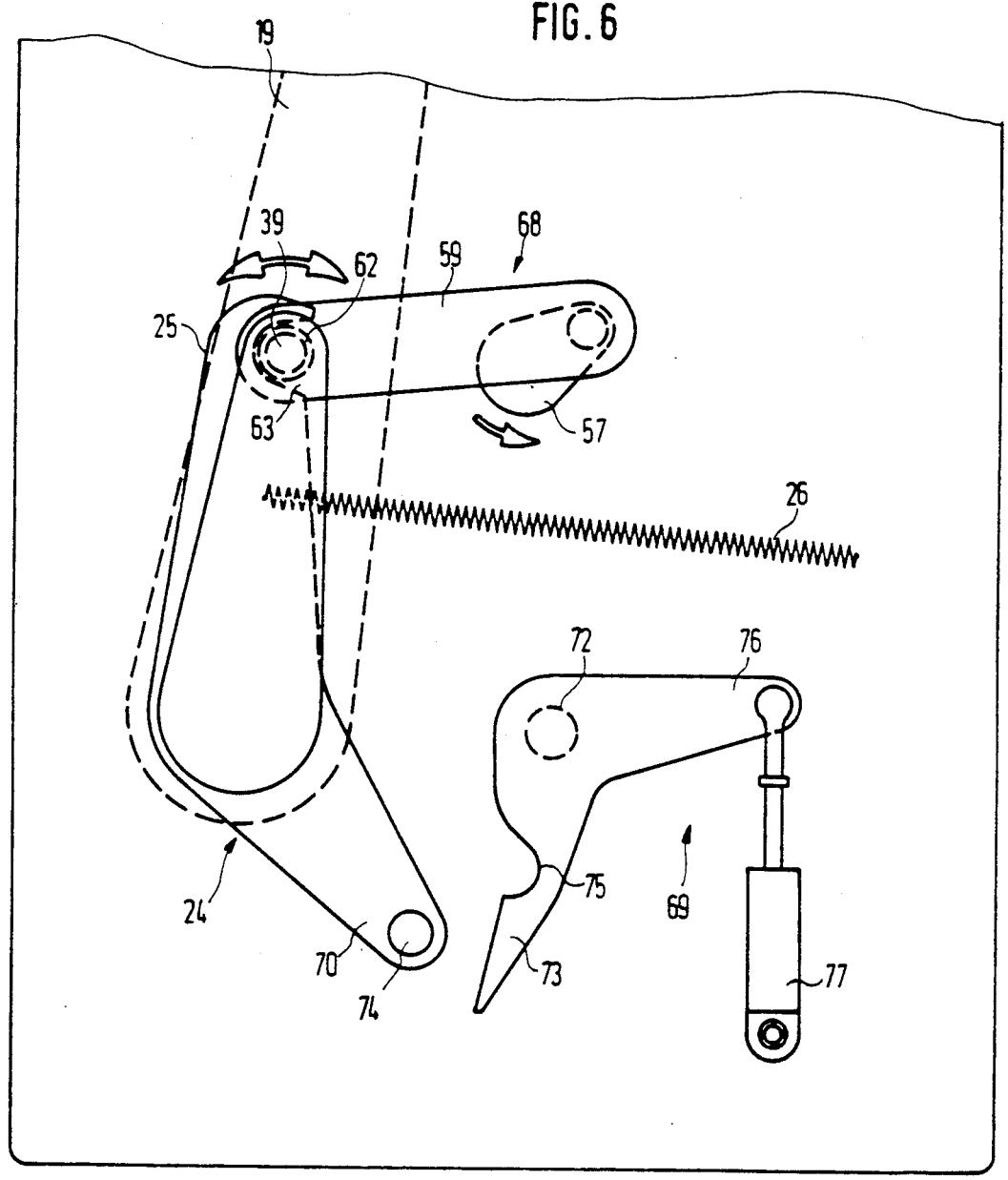

FIG. 5 a representation according to FIG. 2 of another embodiment of the invention, FIG. 6 the drive unit according to FIG. 5 with the drive means being in a different position.

DESCRIPTION OF PREFERRED EMBODIMENTS

The invention is concerned with pushing packs 11, in particular paper tissue packs, from a stack 13 of a pack lifter 14 in groups 12 by means of a pusher 10. It is well known that such packs 11 are grouped in bundles which consist of two, three or four superposed layers of individual packs. The present drive makes it possible to easily determine the number of superposed packs 11 per group 12 by a simple change-over actuation of a control member. The groups are then formed automatically by means of a pusher 10 pushing off a group of two, three or four superposed packs 11.

FIG. 1 shows that packs 11 are delivered to the pack lifter 14 on a conveyor 15. The pack lifter 14 has contra-rotating conveying segments 16, which grasp the packs 11 from underneath and lift them up. Oscillating holding segments 17 of the pack lifter 14 support the lifted packs 11 during the rotating movements of the conveying segments 16.

A stack 13 of packs 11 is formed above the pack filter 14. The packs 11 can be arranged in the stack 13 individually as well as in rows one behind the other.

At the side of the stack 13, the pusher 10 is arranged on a slide 18 such that it can be shifted transverse to the stack 13. The slide 18 is linked to a pusher arm 19 via an articulated coupler 20. The pushing arm 19 is arranged nonrotatably on a main shaft 21. The slide 18 is driven via the pusher arm 19.

FIG. 1 further shows that a movement of the pusher 10 to the left pushes a group 12 of packs 11 onto a discharge conveyor 22. The discharge conveyor 22 conveys the group 12 of packs 11 to a packing machine not shown in the drawing, in which the pack bundles are completed by means of the groups being provided with a wrapping.

FIG. 4 shows that the slide 18 of the pusher 10 can be moved on two slide bars 23. This ensures that the slide 18, to which the pusher 10 is laterally affixed, can be easily moved without canting.

FIG. 3 shows that an actuating layer 24 is also nonrotatingly arranged on the main shaft 21 of the pusher arm 19. As is particularly shown by FIG. 2, a spring 26 designed as a tension spring is affixed to an actuating arm 25 of the actuating lever 24. This spring 26 moves the actuating lever 24 and the pushing arm 19 linked thereto via the main shaft 21 to the right. The load of the spring 26 causes feeler rolls 29, 30 and 31 which are arranged on a feeler arm 27 of the actuating lever 24 on a common axle 28 to abut cams 32, 33 and 34 at the periphery of cam discs 35, 36 and 37. The feeler rolls 29, 30 or 31 then hold the actuating lever 24 in the position shown in FIG. 2.

The actuating lever 24 is kept in its original position until the stack 13 has reached the preset number of superposed packs 11. Then the respective feeler roll 29, 30 or 31 which is resting on the cam 32, 33 or 34 falls into a recess 38 of the cam discs 35, 36 or 37. Now the actuating lever 24 can be pivoted out of its original position shown in FIG. 2 to the right until it abuts a journal 39. This pivoting movement of the actuating lever 24 at the same time actuates the pusher 10 via its connection to the pusher arm 19.

In order to form groups 12 of three different sizes, the three cam discs 35, 36, 37 are provided with different number of recesses 38. Cam disc 35 has three recesses 38 and is meant for making groups 12 of four superposed packs 11. Cam disc 33 has six recesses and serves for making groups 12 of two packs. Cam disc 37 has four recesses, so that groups 12 of three superposed packs 11 are formed.

The cams 32 and 33 and the cam discs 35 and 36 are arranged relative to one another such that the recesses 38 are in alignment. This makes it possible to have the feeler roll 30 also resting on the cam 33 of cam disc 36 while the apparatus is in effective position for a group of four superposed packs 11 (effective cam 32). The feeler roll 30, however, can only enter three of the six recesses 38 of this cam 33, as the cam 32 only provided with three recesses 38 prevents the feeler roll 30 from entering the other three recesses 38. This design of the cam discs 35 and 36 guarantees small setting movements of the cam shaft 40 which holds the cam discs 35, 36 37.

The cam discs 35, 36, 37 are moved to engage the feeler roller 29, 30, 31 by an axial shifting of the cam shaft. This is done by means of a hand lever 41, which is operated by rotating it into the one or the other direction. The hand lever 41 is arranged on a shaft 43 linked to a worm body or blank 42.

When the hand lever 41 is pivoted, the worm body 42 is rotated and a feeler pin 45, entering a groove 44, of a pusher arm 46 is moved into the one or the other direction. The pusher arm 46 is fixed on the cam shaft 40 in a groove 47 in the axial direction such that the cam shaft 40 is shifted axially in the one or the other direction. A holding pin 49 affixed at the housing 48 of the drive prevents rotary movements of the pusher arm 46.

In order to prevent a feeler roll 29, 30 31 from entering a recess 38 of a cam disc 35, 36, 37 during the setting movements of the cam shaft 40, a lock in the form of a rotatable double lever 50 is arranged on the hand lever 41. This double lever 50 temporarily enters with a support roll 51, 52 an indentation 53 of a supporting arm 54 of the actuating lever 24 and prevents the actuating lever 24 from pivoting during the crucial phase of the setting movement of the cam shaft 40.

The drive of the pusher 10, namely a pusher drive 68, is coupled to the drive of the conveying segments 16 or holding segments 17 of the pack lifter 14 shown in FIG. 1. Pusher and segments are driven via a common shaft 55. The cam shaft 40 is driven via a pinion 55 arranged on the crank shaft 55. A crank 57 of the crank shaft 55 actuates a coupler 59 via a journal 58, while said coupler 59 in its turn actuates a pivoted lever 60. The pivoted lever 60 is arranged equiaxially with the pusher arm 19 and the actuating lever 24 on the main shaft 21. The pivoted lever 60, however, is mounted rotatably on the main shaft 21 in the region of a shaft end 61.

At the free end of the pivoted lever 60, the journal 39 is arranged with a roll 62. The actuating arm 25 of the actuating lever 24 rests on this roll 62 with a free end having a recess 63, when the pusher arm 19 is actuated. The actuating arm 25 of the actuating lever 24 is pulled against the journal 39 with the roll 62 by the spring 26. The journal 39 of the pivoted lever 60 catches the movement of the actuating lever 24 and prevents the feeler rolls 29, 30, 31 from coming into contact with the walls of the recesses 38 of the cam discs 35, 36, 37. Besides, the pivoted lever 60 driven by the crank shaft 55 exactly determines with its journal 39 the movements of the pusher arm 19 which is actuating the pusher 10, so that the pusher 10 always moves at the right time, when the group 12 of the stack 13 is ready for discharge.

The pinion 56 of the crank shaft 55 is in engagement with a cogwheel 64 of an intermediate shaft 65. This could not be shown in FIG. 3 because of the representation requirements. A roller-like pinion 66 is arranged on the intermediate shaft 65 which engages a cog wheel 67 of the cam shaft 40. During the axial setting movements of the cam shaft 40, the cogwheel 67 is shiftable in the roller-like pinion 66.

Setting out from the crank shaft 55 or the pinion 56, there is a gear reduction down to the cam shaft 40 or the cam discs 35, 36, 37, in the present embodiment specifically at a ratio of 12:1. This means that while the crank 57 is performing twelve revolutions, the cam discs 35, 36, 37 only perform one. This ratio to 12 is the least common multiple of the possible stack sizes of 2, 3, 4 packs on top of one another. This means that at each rotation of a cam 35, 36, 37, a stack 13 is formed several times and pushed off by the pusher 10.

If for example groups 12 of four superposed packs 11 are to be produced, this means that in the region between two adjacent recesses 38 in the cam 32, four lifting cycles of the pack lifter 14 take place which stack four packs 11 on top of one another before the feeler roll 29 enters the (next) recess 38. In analogy, the other cam discs always work with cycles of 1/12.

The preferred embodiment shown in FIGS. 5 and 6 is simplified as regards actuation of the coupling means, namely the actuating lever 24. Employment of the mechanical control of the coupling means (actuating lever 24) by means of cam discs 32, 33 and 34 is dropped without substitution. Instead, the two-armed actuating lever 24 is held in the region of a supporting arm 70 thereof by a lock 71 in the decoupled starting position. The lock 71 consists of a (two-armed) locking lever 69 which is pivotable about a lever bearing 72. A free locking arm 73 holds the supporting arm 70 and there-with the actuating lever 24 by means of receiving a locking journal 74 in an indentation 75 of the locking lever 69. The other free pivoted arm 76 of the locking lever 69 is connected to an actuation means, in this case to a pressure medium cylinder 77. By extending the piston rod of the pressure medium cylinder 77, the locking lever 69 is pivoted anti-clockwise, thus releasing the actuating lever 24 out of the locking position. The pusher arm 19 and the pusher drive 68 can now be linked in the aforedescribed way by means of the effect of the spring 26.

After a pushing-off cycle has been completed, the coupling means, namely the actuating lever 24,, is moved back into starting position by the pusher drive 68 (FIG. 2 and FIG. 5). The lock, namely the locking lever 69, can now lock into place by means of an appropriate pivoting movement and hold the actuating lever 24 in the decoupled position according to FIG. 5.

As can be seen especially in FIG. 6, the movements are coordinated such that the coupling means, namely the actuating lever 24, is released during the end position of the pusher drive 68, namely the coupling 59. The actuating lever 24 comes into engagement with the pusher drive 68, namely the journal 39, via a very short pivoting movement.

Especially with a solution employing electric or electronic scanning of one or more cam discs, it would also be possible in principle to actuate the pusher 10 for instance pneumatically via a compressed-air cylinder instead of using a spring 26.

What is claimed is:

1. An apparatus for forming groups of cuboidal packs (11) by pushing a group (12) of superposed packs (11) from the top of a stack (13) of packs (11) which are stacked on top of one another by a pack lifter (14) which supplies said stack (13) with packs (11) by lifting packs (11) from below the stack, said apparatus comprising:
   a) an intermittently operated pusher (10) which pushes said group (12) of packs (11) in a transverse direction off of said stack (13) and onto a discharge conveyor (22);
   b) a pusher drive (68) which is coupled to said pusher (10) and to a drive for the pack lifter (14) to produce, after each lifting movement of a pack (11) from below the stack, a drive movement of the pusher;
   c) said pusher (10) comprising an actuating lever (24) and a pushing arm (19) which are fixed to a common main shaft (21);
   d) spring means (26) for moving said actuating lever (24) and, thereby, said pusher (10) in a pushing direction; and
   e) locking means for locking, in an initial position, said actuating lever (24) and thereby said pusher (10), said actuating lever and said pusher being movable by said pusher drive (68) in a direction opposite to said pushing direction;
   f) said locking means comprising a pivotable locking lever (69) which contacts and supports said actuating lever (24) in a locked position.
   g) said actuating lever (24) being held in its initial position until there is a preselected number of superposed packs (11) in said group on the top of said stack (13).

2. The apparatus as claimed in claim 1, wherein said pusher drive (68) is a continuously rotating crank drive, and wherein said actuating lever (24) is movable into contact with a corotating stop (39) of said pusher drive (68) for linking said pusher drive (68) with said pusher.

3. The apparatus as claimed in claim 2, wherein said pusher drive (68) is supported in a freely rotatable state by a pivoted lever (60) on the main shaft (21).

4. The apparatus as claimed in claim 1, wherein said actuating lever (24) is a two-armed lever and wherein the locking means for locking said actuating lever (24) comprises an arm (27, 70) extending from an end of said actuating lever.

5. The apparatus as claimed in claim 2, wherein said locking lever (69) is a two-armed lever and is pivotable via a pressure medium cylinder.

6. The apparatus as claimed in claim 1, wherein said pusher drive (68) has a control member which is settable by a handle (41), said control member being driven in accordance with the lifting movements of said pack lifter (14) and controlling the pushing-off movement of said pusher (10), such that in accordance with the setting of the control member, the packs (11) are pushed off the stack (13) in groups (12) consisting of a prechosen number of superposed layers.

7. The apparatus as claimed in claim 6, wherein said control member comprises several cam discs (35, 36, 37) arranged on a common cam shaft (40), with feeler means (29, 30, 31), controlling the pushing-off movements of said pusher (10), resting on said cam discs (35, 36, 37), said feeler means being selectively activated by means of said handle (41).

8. The apparatus as claimed in claim 7, wherein said cam discs (35, 36 37) have a different number of recesses (38) for said feeler means (29, 30, 31).

9. The apparatus as claimed in claim 2, wherein said actuating lever (24) is linkable to the continuously rotating crank drive with said pusher drive being in a position directly adjacent to and facing towards said actuating lever.

* * * * *